US012566365B2

(12) United States Patent
Hirasawa et al.

(10) Patent No.: US 12,566,365 B2
(45) Date of Patent: Mar. 3, 2026

(54) IMAGE PROJECTION APPARATUS

(71) Applicant: Ricoh Company, Ltd., Tokyo (JP)

(72) Inventors: Tomoyasu Hirasawa, Kanagawa (JP);
Toshinobu Matsuyama, Kanagawa (JP)

(73) Assignee: RICOH COMPANY, LTD., Tokyo (JP)

( * ) Notice: Subject to any disclaimer, the term of this
patent is extended or adjusted under 35
U.S.C. 154(b) by 427 days.

(21) Appl. No.: 18/085,581

(22) Filed: Dec. 21, 2022

(65) Prior Publication Data

US 2023/0205069 A1      Jun. 29, 2023

(30) Foreign Application Priority Data

Dec. 24, 2021      (JP) ................................. 2021-211215

(51) Int. Cl.
*G03B 21/20*         (2006.01)
*G02B 26/00*         (2006.01)
*G03B 21/16*         (2006.01)

(52) U.S. Cl.
CPC ......... *G03B 21/204* (2013.01); *G02B 26/008*
(2013.01); *G03B 21/16* (2013.01)

(58) Field of Classification Search
None
See application file for complete search history.

(56) References Cited

U.S. PATENT DOCUMENTS

2012/0162919 A1* 6/2012 Lin ..................... H01L 23/3675
                                                              361/704
2014/0211170 A1* 7/2014 Kitano ................. G03B 21/204
                                                              353/31

(Continued)

FOREIGN PATENT DOCUMENTS

| | | |
|---|---|---|
| JP | 2014160233 A | 9/2014 |
| JP | 2014-238485 | 12/2014 |

(Continued)

OTHER PUBLICATIONS

Office Action issued on Aug. 13, 2025, in corresponding Chinese
patent Application No. 202211588896.0, 16 pages.

(Continued)

*Primary Examiner* — Bao-Luan Q Le
*Assistant Examiner* — Danell L Owens
(74) *Attorney, Agent, or Firm* — XSENSUS LLP

(57)                ABSTRACT

An image projection apparatus includes a light source module including a light source to emit excitation light, a pair of phosphor wheels, a light mixing element, an optical system to guide the excitation light emitted from the light source to the pair of phosphor wheels, and combine a pair of fluorescent lights emitted from the pair of phosphor wheels and guide combined fluorescent light to the light mixing element, an optical casing hermetically sealing the optical system, a first cooling casing hermetically sealing one of the phosphor wheels and having a first airflow circulation path, and a second cooling casing hermetically sealing another one of the pair of phosphor wheels and having a second airflow circulation path, an optical modulation element to modulate the light emitted from the light mixing element, and a projection optical system to project the light modulated by the optical modulation element onto a display device.

12 Claims, 4 Drawing Sheets

(56)  References Cited

U.S. PATENT DOCUMENTS

| | | |
|---|---|---|
| 2014/0219677 A1 | 8/2014 | Ikeda et al. |
| 2014/0233996 A1 | 8/2014 | Ikeda et al. |
| 2014/0308058 A1 | 10/2014 | Ikeda et al. |
| 2014/0334858 A1 | 11/2014 | Miyagawa et al. |
| 2015/0010338 A1 | 1/2015 | Miyagawa et al. |
| 2015/0071677 A1 | 3/2015 | Hirasawa et al. |
| 2015/0160610 A1 | 6/2015 | Watanabe et al. |
| 2015/0217586 A1 | 8/2015 | Ikeda et al. |
| 2015/0227111 A1 | 8/2015 | Ikeda et al. |
| 2015/0277304 A1 | 10/2015 | Ikeda et al. |
| 2016/0048106 A1 | 2/2016 | Hirasawa et al. |
| 2016/0195847 A1 | 7/2016 | Ikeda et al. |
| 2016/0211636 A1 | 7/2016 | Hirasawa |
| 2016/0342136 A1 | 11/2016 | Ikeda et al. |
| 2017/0001459 A1 | 1/2017 | Uehira et al. |
| 2017/0192346 A1* | 7/2017 | Chikayama .......... G02B 26/008 |
| 2018/0149953 A1 | 5/2018 | Nomoto |
| 2018/0180360 A1 | 6/2018 | Katoh et al. |
| 2018/0290476 A1 | 10/2018 | Uehira et al. |
| 2019/0390918 A1 | 12/2019 | Hirasawa et al. |
| 2020/0386489 A1 | 12/2020 | Baba et al. |

FOREIGN PATENT DOCUMENTS

| | | | |
|---|---|---|---|
| JP | 2017-142482 | 8/2017 | |
| JP | 2018084752 A * | 5/2018 | ........... F21V 29/677 |
| JP | 2020098265 A | 6/2020 | |
| JP | 2021-060591 | 4/2021 | |

OTHER PUBLICATIONS

Office Action issued Aug. 26, 2025 in corresponding Japanese Patent Application No. 2021-211215.

* cited by examiner

FIG. 1

BASE

BASE

BASE

IMAGE PROJECTION APPARATUS

CROSS-REFERENCE TO RELATED APPLICATION

This patent application is based on and claims priority pursuant to 35 U.S.C. § 119(a) to Japanese Patent Application No. 2021-211215, filed on Dec. 24, 2021, in the Japan Patent Office, the entire disclosure of which is hereby incorporated by reference herein.

BACKGROUND

Technical Field

Embodiments of the present disclosure relate to an image projection apparatus.

Background Art

In image projection apparatuses such as a projector using a laser diode (LD) that serves as a light source, typically, a light source module is provided with a single LD and a single phosphor. However, for the purposes of increasing the radiation intensity of the light of a projector, for example, some technologies have been developed and proposed that a pair of laser diodes (LD) and a pair of phosphors are used and a pair of fluorescent lights emitted from the pair of phosphors are combined and output as combined light.

The excitation light is converted into fluorescent light in the light source module, and the conversion efficiency from excitation light to fluorescence tends to be higher as the temperature of the phosphor is lower. For this reason, in order to increase the conversion efficiency from excitation light to fluorescent light, typically, the phosphor is cooled down to lower the temperature of the phosphor.

SUMMARY

Embodiments of the present disclosure described herein provide an image projection apparatus includes a light source module including a light source to emit excitation light, a pair of phosphor wheels, a light mixing element, an optical system to guide the excitation light emitted from the light source to the pair of phosphor wheels, and combine a pair of fluorescent lights emitted from the pair of phosphor wheels and guide combined fluorescent light to the light mixing element, an optical casing hermetically sealing the optical system, a first cooling casing hermetically sealing one of the pair of phosphor wheels and having a first airflow circulation path, and a second cooling casing hermetically sealing another one of the pair of phosphor wheels and having a second airflow circulation path, an optical modulation element to modulate the light emitted from the light mixing element, and a projection optical system to project the light modulated by the optical modulation element onto a display device. In the image projection apparatus, each one of the first airflow circulation path of the first cooling casing and the second airflow circulation path of the second cooling casing has an axis, and the axis is parallel to or orthogonal to an optical axis of the combined fluorescent light.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 1 is a diagram illustrating a configuration or structure of a projector that adopts an image projection apparatus, according to an embodiment of the present disclosure.

Figure 2:
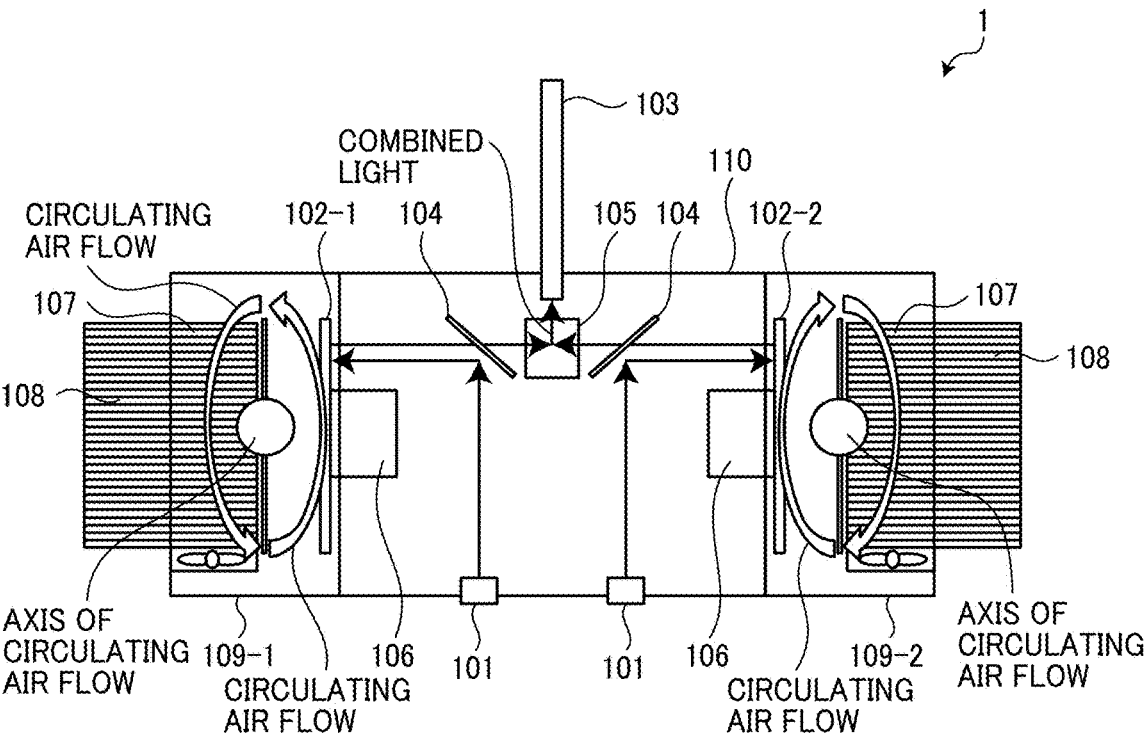
FIG. 2 is a diagram illustrating an outline of a light source module according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image projection apparatus according to an embodiment of the present disclosure is described below in detail with reference to the accompanying drawings.

Figure 1:
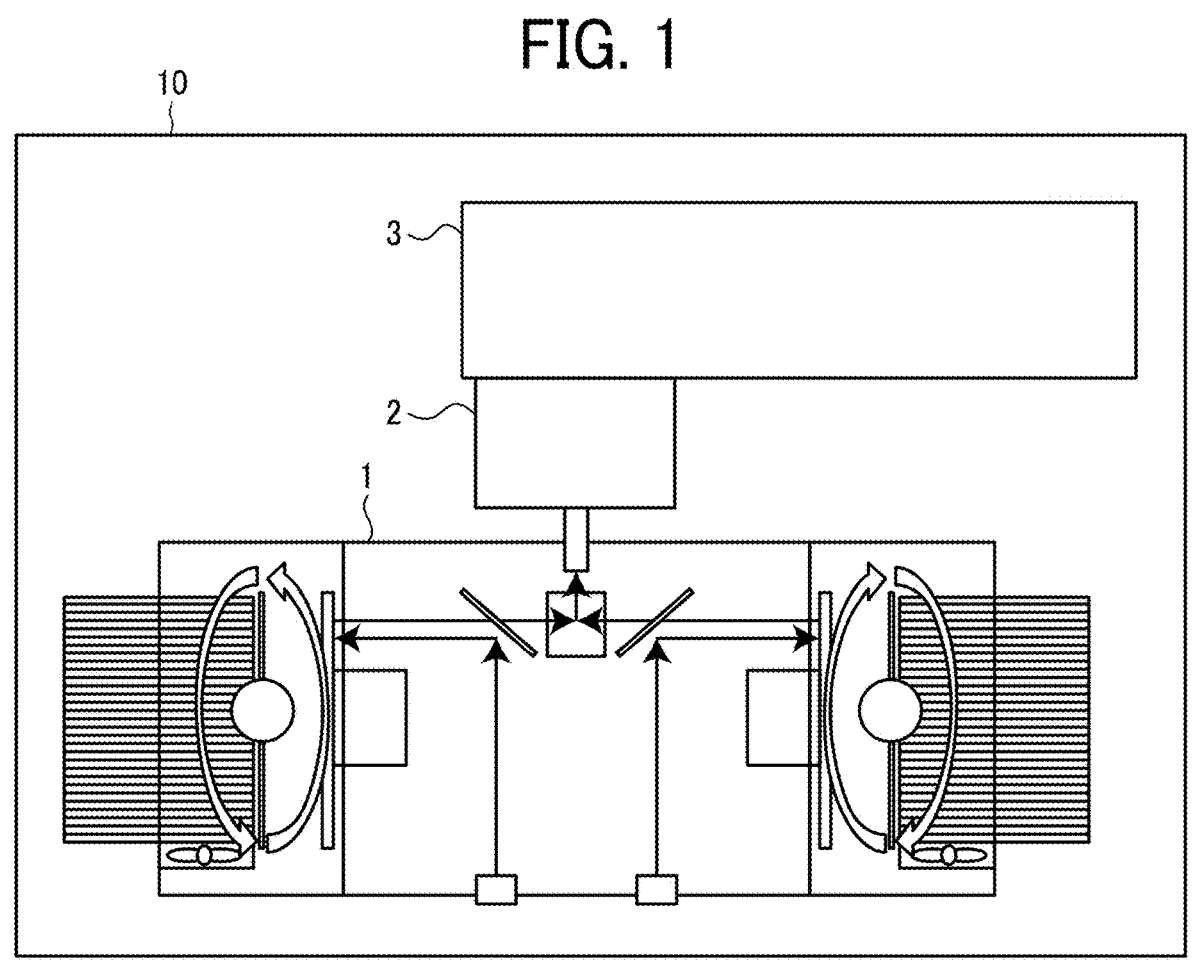

FIG. 1 is a diagram illustrating a configuration or structure of a projector 10 that adopts an image projection apparatus, according to an embodiment of the present disclosure.

As illustrated in FIG. 1, the projector 10 according to the present embodiment includes a light source module 1, an optical modulation element 2, and a projection optical system 3.

The light source module 1 according to the present embodiment includes a pair of laser diodes (LD) 101 each of which serves as a laser-diode (LD) light source, a pair of phosphor wheels 102-1 and 102-2, a light mixing element 103, and an optical system that guides the excitation light emitted from the pair of laser diodes (LD) 101 to the pair of phosphor wheels 102-1 and 102-2 and guides the combined light obtained by combining the fluorescent light emitted from the pair of phosphor wheels 102-1 and 102-2 to the light mixing element 103. For example, the optical modulation element 2 according to the present embodiment modulates the light emitted from the light mixing element 103 of the light source module 1. For example, the projection optical system 3 according to the present embodiment projects the light modulated by the optical modulation element 2 onto a display device such as a screen.

FIG. 2 is a diagram illustrating an outline of the light source module 1 according to the present embodiment. As illustrated in FIG. 2, the light source module 1 according to the present embodiment includes a pair of laser diodes (LD) 101, a pair of phosphor wheels 102-1 and 102-2, a light mixing element, a pair of dichroic mirrors 104, a prism 105, a pair of motors 106, a heatsink 107, a dissipator 108, a first cooling casing 109-1, a second cooling casing 109-2, and an optical casing 110. The pair of phosphor wheels 102-1 and 102-2 max be referred to simply as the phosphor wheel 102 in the following description of the present embodiment when it is not necessary to make a distinction between those phosphor wheels. In a similar manner, the first cooling casing 109-1 and the second cooling casing 109-2 may be referred to simply as the cooling casing 109 in the following description of the present embodiment when it is not necessary to make a distinction between those cooling casings.

For example, the pair of laser diodes (LD) 101 according to the present embodiment emit light. The light source module 1 according to the present embodiment is provided with the pair of laser diodes (LD) 101. The pair of dichroic mirrors 104 according to the present embodiment reflect the light emitted from the pair of laser diodes (LD) 101, and cause the light to enter the phosphor layer on phosphor wheel 102 as exciting light.

For example, the pair of phosphor wheels 102-1 and 102-2 performs wavelength conversion on the light that is emitted from the pair of laser diodes (LD) 101 and is reflected by the pair of dichroic mirrors 104, and outputs the resultant light or fluorescent light. The pair of phosphor wheels 102-1 and 102-2 perform the wavelength conversion on the fluorescent light and emit combined light. The prism 105 according to the present embodiment serves as an optical system and guides the combined light to the light mixing element 103.

For example, the optical casing 110 according to the present embodiment hermetically seals an optical system such as the pair of dichroic mirrors 104 and the prism 105. For example, the first cooling casing 109-1 according to the present embodiment hermetically seals the phosphor wheel 102-1 that is one of the two phosphor wheels 102-1 and 102-2, and has an airflow circulation path therein. For example, the second cooling casing 109-2 according to the present embodiment hermetically seals the phosphor wheel 102-2 that is the other one of the two phosphor wheels 102-1 and 102-2, and has an airflow circulation path therein. In other words, each one of the pair of phosphor wheels 102-1 and 102-2 is hermetically sealed by the cooling casing 109 independently from the optical system such as the pair of dichroic mirrors 104 and the prism 105.

The pair of motors 106 according to the present embodiment causes the phosphor wheel 102 to rotate on the axis. The heatsink 107 according to the present embodiment absorbs the heat generated by the phosphor wheel 102. The dissipator 108 according to the present embodiment dissipates the heat received from the phosphor wheel 102 through the heatsink 107 to the outside of the cooling casing 109. In other words, each one of the heatsink 107 and the dissipator 108 according to the present embodiment serves as an endothermic part that thermally connects the inside and the outside of the cooling casing 109. Due to such a configuration, the heat that is generated at the phosphor wheel 102 can be transferred to the heatsink 107 in an efficient manner.

The heatsink 107 and the phosphor wheel 102 are stored in the cooling casing 109. The air flow circulates in the cooling casing 109, and the heat that is generated at the phosphor wheel 102 can be transferred to the heatsink 107 in an efficient manner by the circulating air flow. In other words, the phosphor wheel 102 and the heatsink 107 that serves as an endothermic part are arranged in the circulation path within the cooling casing 109. Alternatively, the motor 106 may be arranged in the circulation path within the cooling casing 109. In such a configuration, the motor 106 can also be cooled down in addition to phosphor wheel 102.

In the present specific embodiment, the axis of the circulating air flow within the cooling casing 109 is orthogonal to the rotation axis of the motor 106. In the present specific embodiment, the optical axis of the combined light combined by the prism 105 is orthogonal to the axis of the circulating air flow. Due to such configurations as described above, the wall of the optical casing 110 becomes parallel to the wall of the cooling casing 109 in face-to-face relation, and dead space does not appear. Accordingly, the light source module 1 can be reduced in size.

In other words, designing the light source module 1 with reference to the combined light allows easy design for the entirety of the light source module 1. Accordingly, when the shape of the optical casing 110 in which an optical system is stored is a rectangular parallelepiped having faces parallel or perpendicular to the combined light, a compact design can be achieved. As the cooling casing 109 in which the air flow circulates gives circulating air flow nearly uniformly, designing the shape of the cooling casing 109 as a rectangular parallelepiped having faces parallel or perpendicular to the axis of the circulating air flow allows a compact design. Due to such a configuration, in the light source module 1 according to the present embodiment, the axis of the airflow circulation path is parallel to or orthogonal to the optical axis of the combined light. Due to such configurations as described above, the wall of the optical casing 110 becomes parallel to the wall of the cooling casing 109 in face-to-face relation, and dead space does not appear. Accordingly, the light source module 1 can be reduced in size.

In the present embodiment, the axis of the airflow circulation path is orthogonal to the optical axis of the combined light. However, for example, when the axis of the circulating air flow is inclined by 90 degrees toward the rotation direction of the motor 106, the axis of the airflow circulation path is parallel to the optical axis of the combined light. Also, in this case, the wall of the optical casing 110 becomes parallel to the wall of the cooling casing 109 in face-to-face relation, and dead space does not appear. Accordingly, the light source module 1 can be reduced in size.

Figure 3:
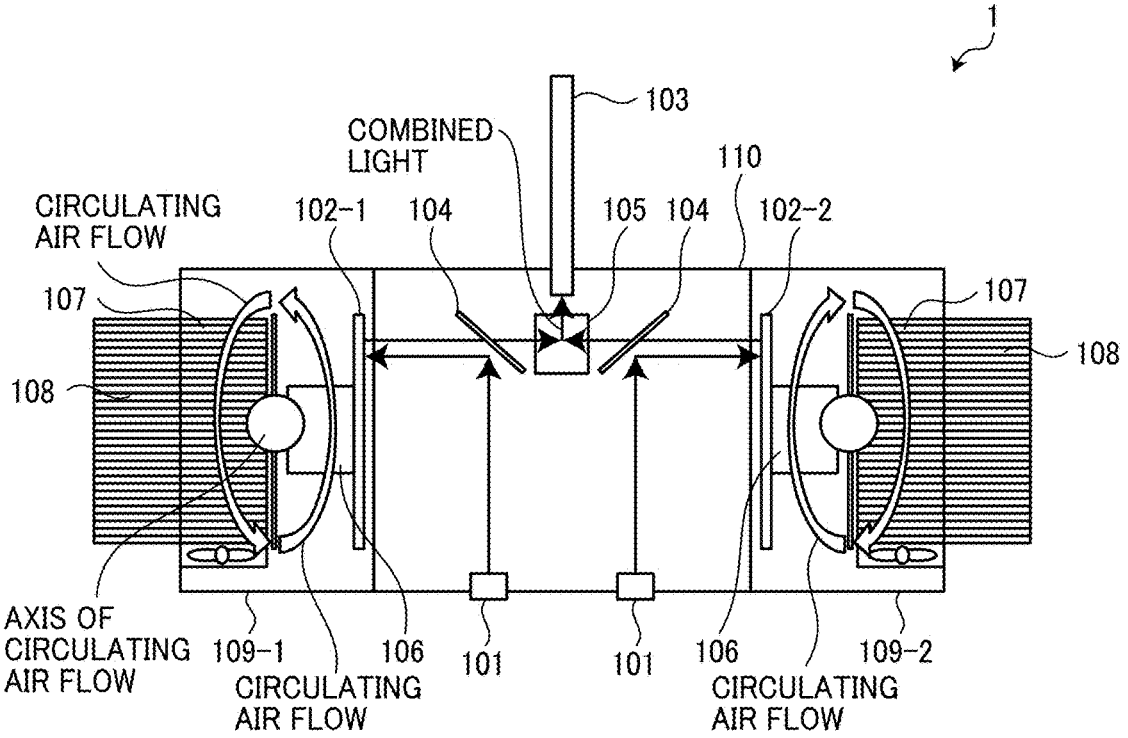
FIG. 3 is a diagram illustrating an outline of a light source module according to an alternative embodiment of the present disclosure.

FIG. 3 is a diagram illustrating an outline of the light source module 1 according to an alternative embodiment of the present disclosure.

In the light source module 1 according to the present embodiment as illustrated in FIG. 2, among the two sides of the phosphor wheel 102, the motor 106 is attached to the other side of the side on which the excitation light is incident. On the other hand, in the light source module 1 according to the present alternative embodiment as illustrated in FIG. 3, among the two sides of the phosphor wheel 102, the motor 106 is attached to the side on which the excitation light is incident.

In other words, in the light source module 1 according to the present alternative embodiment as illustrated in FIG. 3, the motor 106 is arranged in the reversed direction with reference to the phosphor wheel 102 compared with the light source module 1 as illustrated in FIG. 2. Due to such a configuration, the motor 106 can also be cooled down by the circulating air flow within the cooling casing 109 in addition to phosphor wheel 102.

Figure 4:
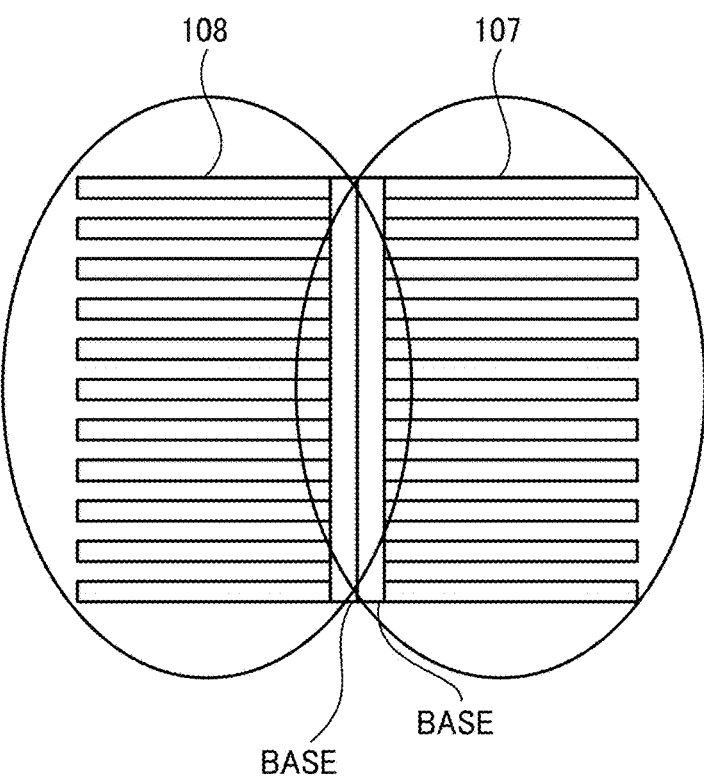
FIG. 4 is a diagram illustrating a configuration or structure of a heatsink and a dissipator provided for a light source module, according to an embodiment of the present disclosure.

FIG. 4 is a diagram illustrating a configuration or structure of the heatsink 107 and the dissipator 108 provided for the light source module 1, according to the present embodiment.

As illustrated in FIG. 4, in the present embodiment, the heatsink 107 and the dissipator 108 are made of, for example, aluminum heatsink, and their bases are in close contact with each other. In other words, the endothermic part that includes the heatsink 107 and the dissipator 108 typically has a thermal-conductive component with good thermal conductivity, and may be formed by bonding together a pair of board-like bases on one side of which a plurality of fins are arranged. Due to such configurations as described above, the heat inside the hermetically-sealed cooling casing 109 can be transferred and dissipated to the outside of the cooling casing 109 with a low-cost configuration.

In the present embodiment, the same heatsink material is used for both the heatsink 107 and the dissipator 108. However, no limitation is indicated thereby, and for example, the size of the base, the shape of the fins, or the number of the fins may be changed as desired. For example, arranging a member such as a thermal-conductive sheet or thermal-conductive grease with high thermal conductivity at a portion where the base of the heatsink 107 and the base of the dissipator 108 are in close contact with each other is effective for heat dissipation from the phosphor wheel 102.

Figure 5:
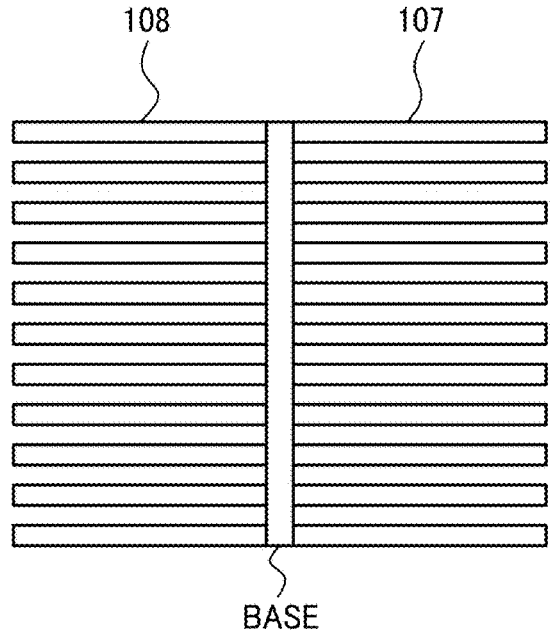
FIG. 5 is a diagram illustrating a configuration or structure of a heatsink and a dissipator provided for a light source module according to an alternative embodiment of the present disclosure.

FIG. 5 is a diagram illustrating a configuration or structure of the heatsink 107 and the dissipator 108 provided for the light source module 1, according to an alternative embodiment of the present disclosure.

In the present embodiment, the heatsink 107 and the dissipator 108 may have a configuration in which a plurality of fins are built on both sides of the base made of aluminum (Al). In other words, the heatsink 107 and the dissipator 108 typically have a thermal-conductive component with good thermal conductivity, and may be board-like bases each of which has a plurality of fins on both sides thereof. Due to such configurations as described above, the heat inside the hermetically-sealed cooling casing 109 can be transferred and dissipated to the outside of the cooling casing 109 with high efficiency. In the present embodiment, the number or shape of the multiple fins on both sides of the base is fixed and the same. However, no limitation is indicated thereby, and fix example, the shape of the fins, or the number of the fins may be changed as desired.

Figure 6:
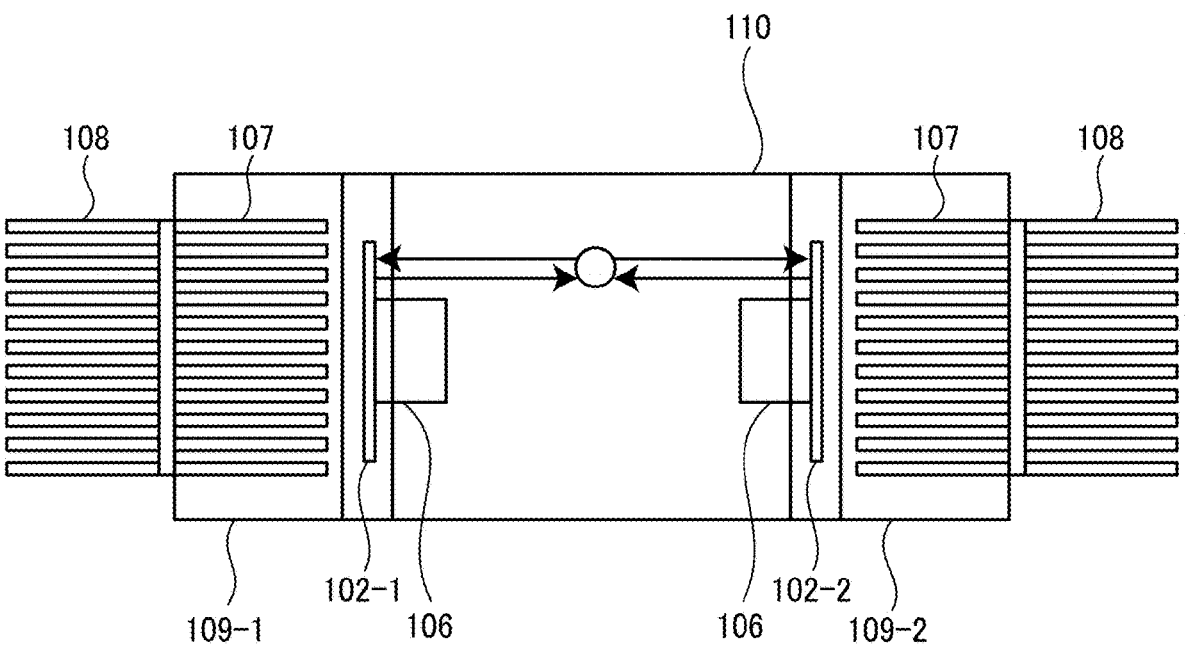
FIG. 6 is a diagram illustrating a light source module viewed in the exit direction of combined light, according to an embodiment of the present disclosure.

FIG. 6 is a diagram illustrating the light source module 1 viewed in the exit direction of combined light, according to the present embodiment.

In the present embodiment, the multiple fins of the dissipator 108 or the heatsink 107 in the cooling casing 109 are parallel to the light exit direction of the combined light that is formed by the prism 105. Due to such a configuration, the multiple fins of the dissipator 108 are in line with each other and are parallel to the combined light. Accordingly, a duct or fan that is used to cause the circulating air flow to act on the multiple fins of the dissipator 108 can be arranged in an efficient manner. Accordingly, various kinds of machines or apparatuses on which the light source module 1 according to the present embodiment is mounted can be downsized. In the present embodiment, the multiple fins of the dissipator

108 are parallel to the combined light. However, no limitation is indicated thereby, and also when the multiple fins of the dissipator 108 are in line with each other to be orthogonal to the combined light, similar advantageous effects can be achieved.

In other words, in the heatsink 107 and the dissipator 108 according to the present embodiment, the multiple fins that are arranged outside the cooling casing 109 are parallel to or orthogonal to an optical axis of the combined light. Accordingly, a duct or fan that is used to cause the circulating air flow to act on the multiple fins arranged outside the cooling casing 109 can be arranged in an efficient manner, and various kinds of machines or apparatuses such as the projector 10 on which the light source module 1 according to the present embodiment is mounted can be downsized.

In the above embodiments of the present disclosure, the axis of the airflow circulation path is orthogonal to or parallel to the optical axis of the combined light. However, no limitation is indicated thereby, and it is not necessary for the axis of all the airflow circulation paths to be orthogonal to or parallel to the optical axis of the combined light in a strict sense. The flow rate or the quantity of flow of the circulating air flow is insusceptible to an error in the shape of the casing or the thickness of the light flux of the combined light. For this reason, as long as an error falls within the range of ±20%, an effect can be achieved as desired.

As described above, with the projector 10 according to the above embodiments of the present disclosure, the optical axis of the combined light combined by the prism 105 is orthogonal to the axis of the circulating air flow. Due to such configurations as described above, the wall of the optical casing 110 becomes parallel to the wall of the cooling casing 109 in face-to-face relation, and dead space does not appear. Accordingly, the light source module 1 can be reduced in size.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image projection apparatus, comprising:
   a light source module including:
      a light source to emit excitation light,
      a pair of phosphor wheels,
      a light mixing element,
      an optical system to guide the excitation light emitted from the light source to the pair of phosphor wheels, and combine a pair of fluorescent lights emitted from the pair of phosphor wheels and guide combined fluorescent light to the light mixing element, an optical casing hermetically sealing the optical system, a first cooling casing including a first wall which separates the first cooling casing from the optical casing, the first cooling casing hermetically sealing one of the pair of phosphor wheels and the first cooling casing having a first airflow circulation path, and a second cooling casing including a second wall which separates the second cooling casing from the optical casing, the second cooling casing hermetically sealing another one of the pair of phosphor wheels and the second cooling casing having a second airflow circulation path;

an optical modulator to modulate the light emitted from the light mixing element; and a projection optical system to project the light modulated by the optical modulation element onto a display device, wherein each one of the first airflow circulation path of the first cooling casing and the second airflow circulation path of the second cooling casing having an axis, and the axis being parallel to or orthogonal to an optical axis of the combined fluorescent light.

2. The image projection apparatus according to claim 1, further comprising:

an endothermic part that thermally connects an inside and an outside of the first cooling casing and the second cooling casing, wherein the endothermic part and one of the pair of phosphor wheels are disposed in each one of the first airflow circulation path and the second airflow circulation path.

3. The image projection apparatus according to claim 2, further comprising a motor that drives each one of the pair of phosphor wheels to rotate in the first airflow circulation path and the second airflow circulation path.

4. The image projection apparatus according to claim 2, wherein the endothermic part has a thermal-conductive component, and is formed by bonding together a pair of boards on one side of which a plurality of fins are disposed.

5. The image projection apparatus according to claim 2, wherein the endothermic part has a thermal-conductive component, and is a board on both sides of which a plurality of fins are disposed.

6. The image projection apparatus according to claim 4, wherein the plurality of fins disposed outside the first cooling casing and the second cooling casing are parallel to or orthogonal to an optical axis of the combined fluorescent light in the endothermic part.

7. The image projection apparatus according to claim 1, wherein the light source is a laser diode.

8. The image projection apparatus according to claim 1, wherein the optical casing is parallel to both the first wall and the second wall.

9. The image projection apparatus according to claim 1, wherein a portion of the first airflow circulation path is parallel a portion of to the second airflow circulation path.

10. A light source module, comprising:

a light source to emit excitation light;

a pair of phosphor wheels;

a light mixing element;

an optical system to guide the excitation light emitted from the light source to the pair of phosphor wheels, and combine a pair of fluorescent lights emitted from the pair of phosphor wheels and guide combined fluorescent light to the light mixing element;

an optical casing hermetically sealing the optical system;

a first cooling casing including a first wall which separates the first cooling casing from the optical casing, the first cooling casing hermetically sealing one of the pair of phosphor wheels and the first cooling casing having a first airflow circulation path; and a second cooling casing including a second wall which separates the second cooling casing from the optical casing, the second cooling casing hermetically sealing another one of the pair of phosphor wheels and the second cooling casing having a second airflow circulation path.

11. The light source according to claim 10, wherein the optical casing is parallel to both the first wall and the second wall.

12. The image projection apparatus according to claim 10, wherein a portion of the first airflow circulation path is parallel a portion of to the second airflow circulation path.

* * * * *